US011101709B2

(12) United States Patent
Watanabe et al.

(10) Patent No.: US 11,101,709 B2
(45) Date of Patent: Aug. 24, 2021

(54) ELECTRIC MOTOR, AIR BLOWER, AND AIR CONDITIONER

(71) Applicant: Mitsubishi Electric Corporation, Tokyo (JP)

(72) Inventors: Takanori Watanabe, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 170 days.

(21) Appl. No.: 16/301,768

(22) PCT Filed: Jul. 28, 2016

(86) PCT No.: PCT/JP2016/072119
§ 371 (c)(1),
(2) Date: Nov. 15, 2018

(87) PCT Pub. No.: WO2018/020631
PCT Pub. Date: Feb. 1, 2018

(65) Prior Publication Data
US 2019/0157928 A1    May 23, 2019

(51) Int. Cl.
*H02K 1/27* (2006.01)
*F24F 1/0007* (2019.01)
(Continued)

(52) U.S. Cl.
CPC .......... *H02K 1/278* (2013.01); *F24F 1/0007* (2013.01); *H02K 7/14* (2013.01); *H02K 21/16* (2013.01);
(Continued)

(58) Field of Classification Search
CPC .......... H02K 1/27; H02K 21/16; H02K 29/03; H02K 7/14; H02K 1/278; H02K 1/276;
(Continued)

(56) References Cited

U.S. PATENT DOCUMENTS 5,396,783 A * 3/1995 Park ...................... F24F 1/0007
62/411
6,858,960 B1 * 2/2005 Muszynski ............ H02K 29/03
310/156.38

(Continued)

FOREIGN PATENT DOCUMENTS

CN    101488694 A    7/2009
JP    2001-157428 A   6/2001
(Continued)

OTHER PUBLICATIONS

Office Action dated May 21, 2019 issued in corresponding JP patent application No. 2018-530277 (and English translation).

(Continued)

*Primary Examiner* — Naishadh N Desai
(74) *Attorney, Agent, or Firm* — Posz Law Group, PLC

(57) ABSTRACT

An electric motor includes a rotor and a stator. The rotor includes a rotor core and a plurality of permanent magnets fixed to an outer surface of the rotor core. The stator includes a stator core including a tooth part and a winding wound around the stator core. The electric motor satisfies an expression of $1 < t2/t1 \leq 8$ where $t1$ is a minimum distance from a center of a front end surface of the tooth part to one permanent magnet of the plurality of permanent magnets and $t2$ is a distance from an end of the tooth part to the one permanent magnet.

16 Claims, 8 Drawing Sheets

(51) Int. Cl.
  *H02K 7/14* (2006.01)
  *H02K 21/16* (2006.01)
  *H02K 29/03* (2006.01)
  *H02K 1/14* (2006.01)
(52) U.S. Cl.
  CPC ............ *H02K 29/03* (2013.01); *H02K 1/146* (2013.01); *H02K 1/276* (2013.01); *H02K 2213/03* (2013.01)
(58) Field of Classification Search
  CPC ... H02K 1/146; H02K 2213/03; F24F 1/0007; F24F 13/24
  See application file for complete search history.

(56) References Cited

U.S. PATENT DOCUMENTS

| | | | | |
|---|---|---|---|---|
| 9,627,936 | B2* | 4/2017 | Nakano | H02K 3/12 |
| 2002/0067092 | A1 | 6/2002 | Crapo et al. | |
| 2005/0269895 | A1 | 12/2005 | Innami et al. | |
| 2009/0195104 | A1* | 8/2009 | Akutsu | H02K 21/14 |
| | | | | 310/156.38 |
| 2010/0026135 | A1* | 2/2010 | Hussey | H02K 1/16 |
| | | | | 310/216.111 |
| 2013/0057106 | A1 | 3/2013 | Sajikawa et al. | |
| 2014/0239765 | A1 | 8/2014 | Akutsu et al. | |
| 2016/0301270 | A1* | 10/2016 | Ota | H02K 1/276 |

FOREIGN PATENT DOCUMENTS

| | | |
|---|---|---|
| JP | 2002-136001 A | 5/2002 |
| JP | 2004-208341 A | 7/2004 |
| JP | 2005-348522 A | 12/2005 |
| JP | 2006-144731 A | 6/2006 |
| JP | 2009-171790 A | 7/2009 |
| JP | 2011-067074 A | 3/2011 |
| JP | 2013-059182 A | 3/2013 |
| WO | 2015/102106 A1 | 7/2015 |

OTHER PUBLICATIONS

International Search Report of the International Searching Authority dated Oct. 18, 2016 for the corresponding international application No. PCT/JP2016/072119 (and English translation).
Chinese Office Action dated May 9, 2020 issued in corresponding CN patent application No. 201680087762.7(and English translation).
Office Action dated Dec. 3, 2019 issued in corresponding JP patent application No. 2018-530277 (and English translation).
Reconsideration Report dated Apr. 1, 2020 issued in corresponding JP patent application No. 2018-530277 (and English translation).
Japanese Office Action dated Mar. 2, 2021 issued in corresponding JP patent application No. 2018-530277(and English translation).

* cited by examiner

ELECTRIC MOTOR, AIR BLOWER, AND AIR CONDITIONER

CROSS REFERENCE TO RELATED APPLICATION

This application is a U.S. national stage application of International Patent Application No. PCT/JP2016/072119 filed on Jul. 28, 2016, the disclosure of which is incorporated herein by reference.

TECHNICAL FIELD

The present invention relates to an electric motor.

BACKGROUND ART

According to the demand for energy saving and increase in manufacturing scale, high-efficiency and low-cost electric motors have been required in recent years. Patent Reference 1, for example, discloses an electric motor having ten poles and twelve slots. For example, as compared to an electric motor having eight poles and twelve slots, the electric motor having ten poles and twelve slots has a large winding coefficient with respect to a fundamental wave and the torque characteristics are improved under the condition of the same magnet volume, and thus the motor efficiency is improved. In addition, in the electric motor having ten poles and twelve slots, reduction of the magnet thickness (the amount of use of magnets) enables reduction of the size and the cost of the electric motor.

PATENT REFERENCE

Patent reference 1: Japanese Patent Application Publication No. 2009-171790

In the electric motor having 10 poles and twelve slots, attraction and repulsion occurring between permanent magnets fixed to a rotor and a tooth part of a stator are concentrated in two tooth parts facing each other, and thus, vibrations of the electric motor caused by deformation of the stator during driving of the electric motor increases.

In a case where the electric motor is eccentric, magnetic flux distribution is asymmetric. Accordingly, electromagnetic excitation force is generated in a radial direction. In this case, a period of the electromagnetic excitation force depends on the number of rotations of the electric motor (specifically, the number of rotations of the rotor). The generation of the electromagnetic excitation force is due to magnetic flux interlinked in the tooth part (interaction between magnetic flux from permanent magnets and magnetic flux generated by a current supplied to winding).

Electromagnetic excitation force is also generated by attraction and repulsion occurring between permanent magnets and a tooth part of the stator. In this case, a period of the electromagnetic excitation force depends on the number of slots formed between the tooth parts and the number of rotations of the electric motor.

Magnetic flux interlinked in the tooth part (flux linkage) change depending on driving of the electric motor (rotation of the rotor). The change in flux linkage is conspicuous when a magnetic pole of the rotor passes through a slot. The change in flux linkage causes torque ripples, which can cause noise and vibrations of the electric motor.

SUMMARY

It is therefore an object of the present invention to reduce torque ripples of an electric motor.

An electric motor according to the present invention includes: a rotor including a rotor core and a plurality of permanent magnets fixed to an outer surface of the rotor core, the rotor having ten magnetic poles and being rotatable on a rotation axis; and a stator including a stator core having a plurality of electromagnetic steel sheets stacked in a rotation axis direction, and including a winding wound around the stator core by concentrated winding, wherein the stator core includes twelve slots, and a tooth part having a front end surface facing one permanent magnet of the plurality of permanent magnets, the tooth part being adjacent to at least one of the slots the electric motor satisfies an expression of $1 < t2/t1 \leq 8$ where t1 is a minimum distance from a center of the front end surface in a circumferential direction to the one permanent magnet, and t2 is a distance from an end of the front end surface in the circumferential direction to the one permanent magnet, and a ratio R1/R2 of a distance R1 to a radius R2 of the stator is 0.50 or more and 0.625 or less, the distance R1 being a distance from the rotation axis to a permanent magnet center part that is a center of the one permanent magnet in the circumferential direction.

According to the present invention, torque ripples of an electric motor can be reduced.

DETAILED DESCRIPTION

First Embodiment

Figure 1:
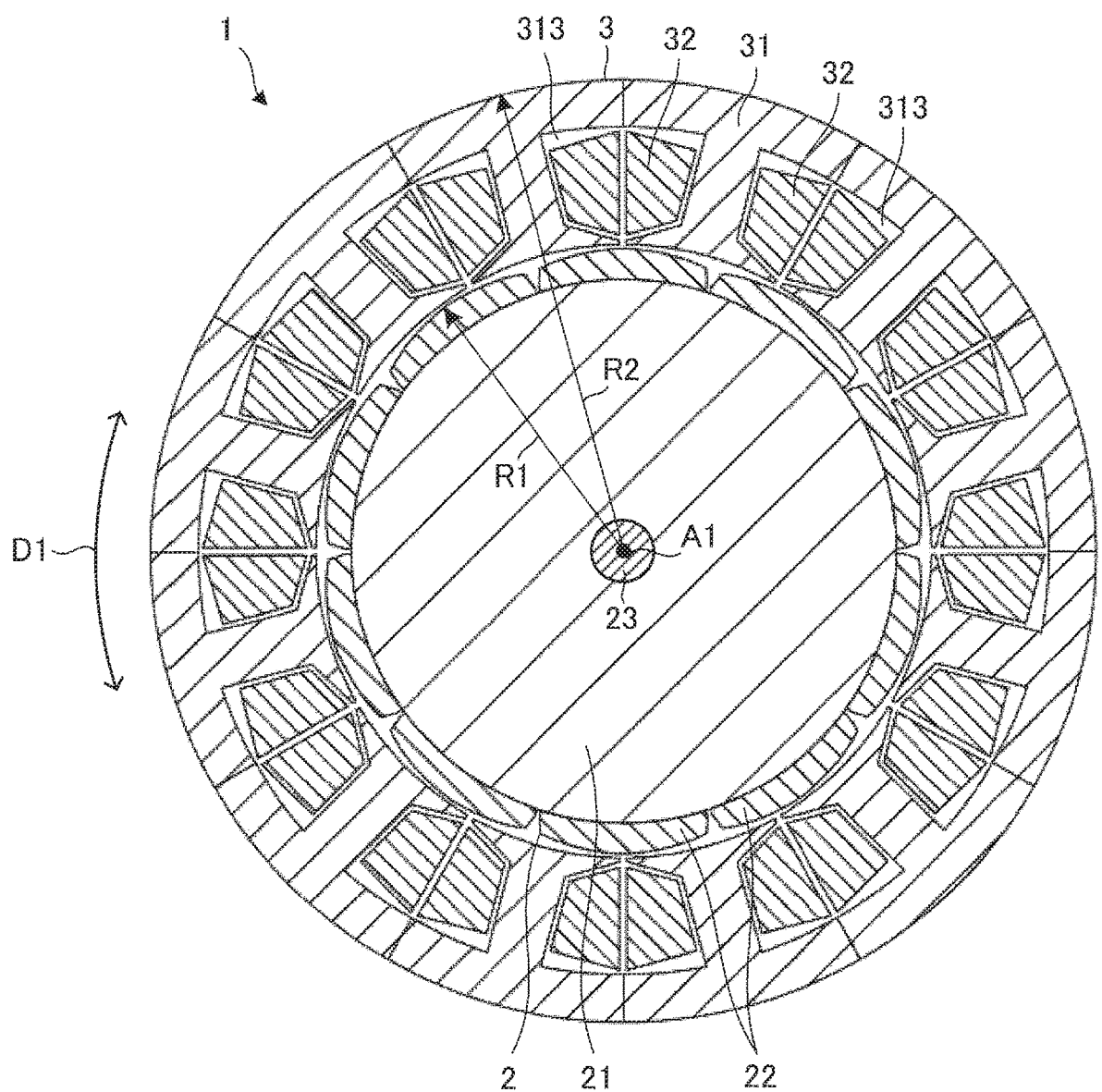
FIG. 1 is a cross-sectional view schematically illustrating an internal structure of an electric motor according to a first embodiment of the present invention.

FIG. 1 is a cross-sectional view schematically illustrating an internal structure of an electric motor 1 according to a first embodiment of the present invention. Arrow D1 indicates a direction along outer circumferences of a rotor 2, a stator core 31, and a stator 3 (hereinafter referred to as a "circumferential direction").

Figure 2:
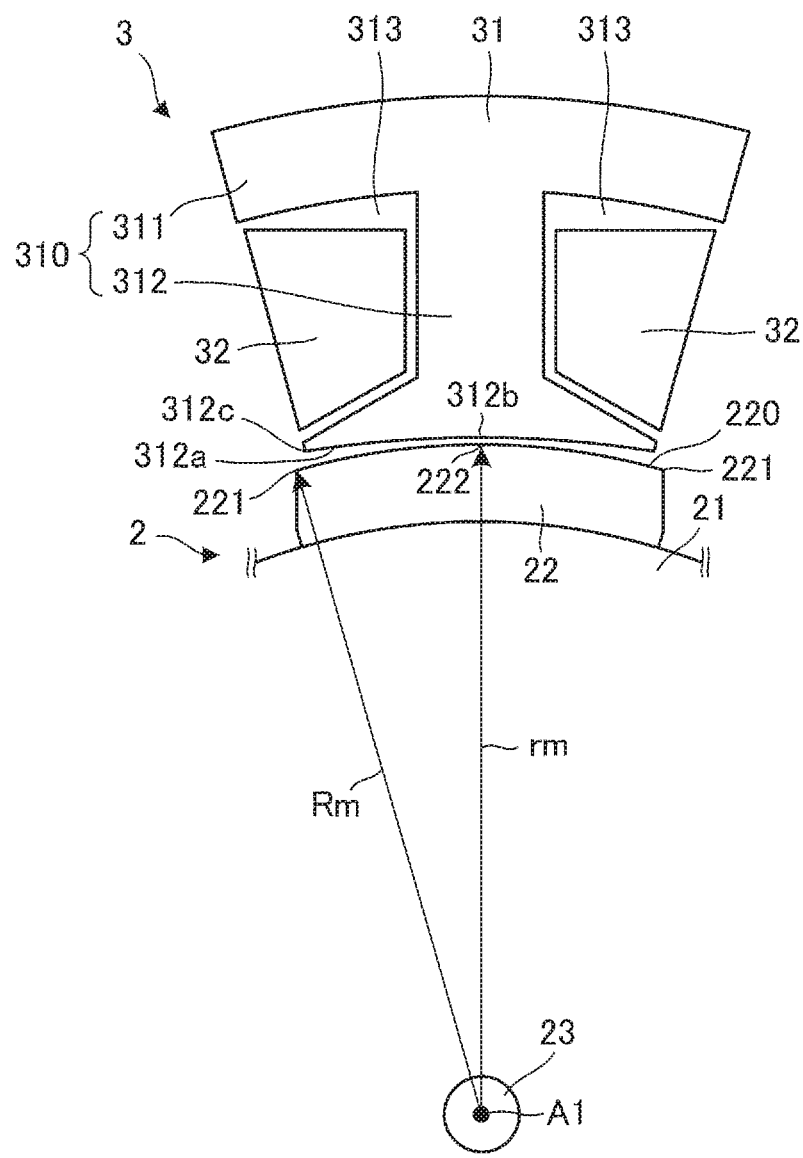
FIG. 2 is a partial cross-sectional view schematically illustrating structures of a part of a rotor and a part of a stator.

FIG. 2 is a partial cross-sectional view schematically illustrating structures of a part of the rotor 2 and a part of the stator 3.

The electric motor 1 includes the rotor 2 and the stator 3. The electric motor 1 is a three-phase synchronous motor, for example. The electric motor 1 is not limited to the three-phase synchronous motor.

The electric motor 1 may further include a magnetic sensor for detecting a rotation position of the rotor 2, a circuit board on which the magnetic sensor and a control circuit are mounted, and bearings rotatably supporting both ends of a shaft 23 of the rotor 2.

The rotor 2 includes a rotor core 21, a plurality of permanent magnets 22, and the shaft 23. The rotor 2 is rotatable on a rotation axis A1. The rotor 2 is rotatably disposed inside the stator 3 with a gap interposed therebetween.

A ratio R1/R2 (outer diameter ratio) between a radius R1 (maximum outer diameter) of the rotor 2 and a radius R2 (maximum outer diameter) of the stator 3 is preferably 0.50 or more and 0.625 or less (50%≤R1/R2≤62.5%). The ratio R1/R2 is more preferably 0.50 or more and 0.55 or less (50%≤R1/R2≤55%).

When the radius R1 of the rotor 2 is reduced with respect to the radius R2 of the stator 3, the surface area of the permanent magnets 22 decreases. Accordingly, magnetic attraction force exerted between the permanent magnet 22 and a front end of a tooth part 312 decreases, and core cogging torque generated when the rotor 2 rotates in a non-excitation state decreases.

The radius R1 of the rotor 2 (FIG. 1) is equal to a distance rm from the rotation axis A1 to a permanent magnet center 222 (FIG. 2). The permanent magnet center 222 is the center in the circumferential direction of a surface 220 of the permanent magnet 22 facing the tooth part 312.

The rotor core 21 is formed by stacking a plurality of electromagnetic steel sheets in a rotation axis direction (i.e., a direction parallel to the rotation axis A1).

The plurality of permanent magnets 22 are fixed to the outer surface of the rotor core 21. That is, in this embodiment, the electric motor 1 is a surface permanent magnet (SPM) motor. In the example illustrated in FIG. 1, ten permanent magnets 22 are fixed to the outer surface of the rotor core 21. Accordingly, the rotor 2 includes ten magnetic poles. The number of the permanent magnets 22 (the number of magnetic poles) is not limited to 10. The plurality of permanent magnets 22 are arranged in the circumferential direction of the rotor core 21 in such a manner that polarities (north poles and south poles) are alternately different with respect to the stator 3.

Each of the permanent magnets 22 has an arc shape in cross section. For example, the surface 220 of each of the permanent magnets 22 is formed in the shape of an arc in the circumferential direction of the rotor 2 (the rotor core 21). That is, in this embodiment, the surface 220 of each of the permanent magnets 22 is a curved surface. The surface 220 of each of the permanent magnets 22 is not limited to the curved surface. The permanent magnets 22 are, for example, ferrite sintered magnets.

A distance Rm from a permanent magnet end 221 that is an end of the surface 220 of permanent magnet 22 in the circumferential direction to the rotation axis A1 is smaller than the distance rm from the permanent magnet center 222 to the rotation axis A1 (an outermost diameter of the rotor 2). That is, the permanent magnet 22 has a shape satisfying a relationship of Rm<rm.

The stator 3 includes a stator core 31 and a winding 32. The stator 3 is disposed outside the rotor 2 with a gap interposed therebetween.

The stator core 31 is formed by stacking a plurality of electromagnetic steel sheets in a rotation axis direction. Each electromagnetic steel sheet has a ring shape. Thus, the stator core 31 has a ring shape. In this embodiment, the stator core 31 is formed of a plurality of split cores 310 arranged annularly in the circumferential direction on the rotation axis A1. That is, the electromagnetic steel sheets serving as the plurality of split cores 310 coupled to one another in one direction are folded annularly, thereby forming the annular stator core 31.

Since the stator core 31 is formed of split cores, the density of the winding 32 can be increased. Accordingly, a decrease in an induced voltage, an increase in an electric resistance value, an increase in copper loss, and a decrease in motor efficiency can be prevented.

In this embodiment, the length of the stator core 31 in the rotation axis direction is equal to or less than half the diameter of the stator core 31.

The stator core 31 includes a plurality of yokes 311, a plurality of tooth parts 312, and a plurality of slots 313. The stator core 31 is formed of the plurality of split cores 310. Thus, each of the split cores 310 includes the yoke 311 and the tooth part 312.

The slot 313 is a space formed between the tooth parts 312. In the example illustrated in FIG. 1, the stator core 31 includes twelve slots 313. However, the number of slots 313 is not limited to 12.

The tooth parts 312 are portions of electromagnetic steel sheets and are formed to project toward the inside of the stator 3 (the stator core 31). In other words, each of the tooth parts 312 extends from the yoke 311 toward the rotation axis A1, and is adjacent to at least one of the slots 313. Each of the tooth parts 312 have a front end surface 312a facing the permanent magnet 22. Tooth ends 312c are ends of the front end surface 312a in the circumferential direction. A tooth center 312b is the center of the front end surface 312a in the circumferential direction. The front end (i.e., the front end surface 312a) of each of the tooth parts 312 is formed in the shape of an arc in the cross section illustrated in FIG. 2. That is, the front end surface 312a is a curved surface.

Figure 3:
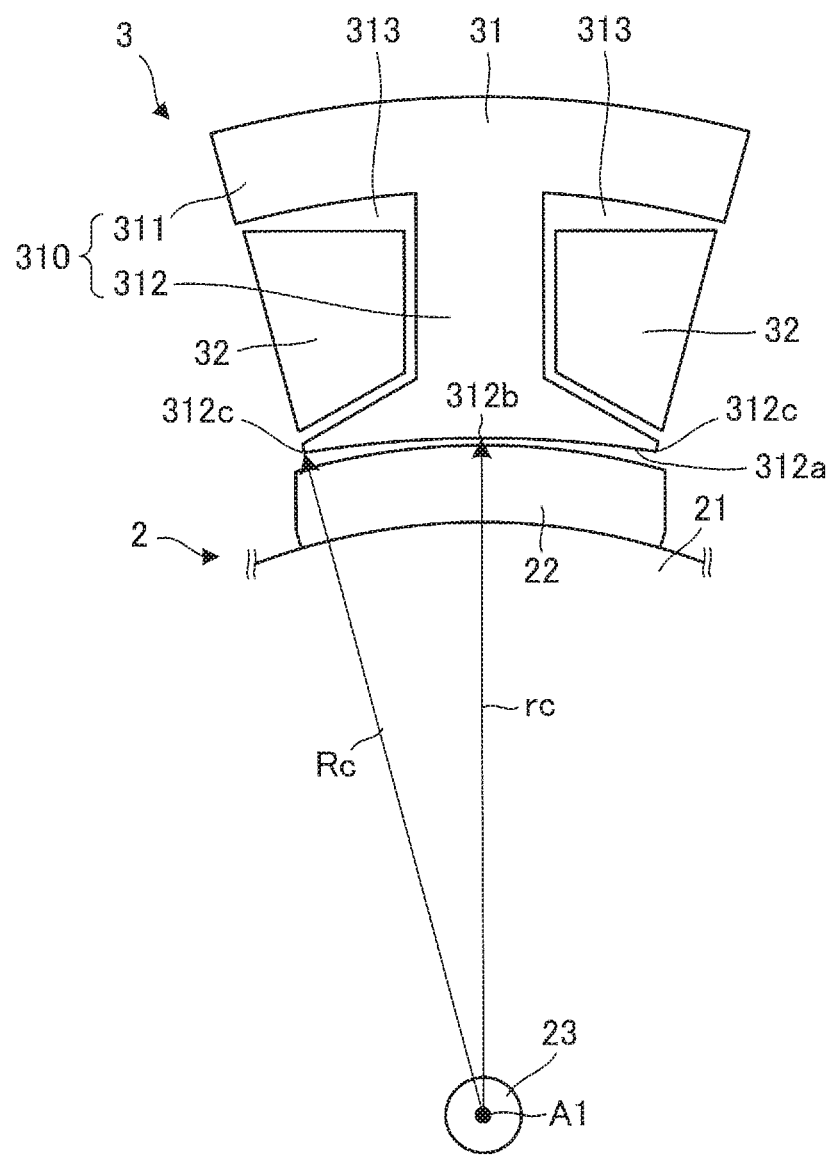
FIG. 3 is a partial cross-sectional view schematically illustrating structures of a part of the rotor and a part of the stator.

FIG. 3 is a partial cross-sectional view schematically illustrating structures of a part of the rotor 2 and a part of the stator 3.

A distance Rc [mm] from the tooth end 312c to the rotation axis A1 is longer than a distance rc [mm] from the tooth center 312b to the rotation axis A1.

The winding 32 is wound around the stator core 31 (specifically, the tooth part 312) with an insulator in between in such a manner that the winding 32 passes through the slot 313. In this embodiment, the winding 32 is wound around the stator core 31 (specifically, the tooth part 312) by concentrated winding. For example, the winding 32 is molded integrally with the stator core 31 and the insulator with a thermoplastic resin. A material for the winding 32 is, for example, an aluminum wire or a copper wire. The use of aluminum wire as a material for the winding 32 can reduce the weight of the electric motor 1 and reduce costs, as compared to copper wire. It is preferable to wind an aluminum wire with small winding tension, since its specific gravity is small compared to a copper wire and accordingly the aluminum wire is easily deformed.

A current from an external power supply is applied to the winding 32. In this embodiment, a plurality of windings 32 form three-phase coils. That is, the number of each phase (U phase, V phase, and W phase) is two, and the windings 32 of each phase (U phase, V phase, and W phase) are allocated to four tooth parts 312. The windings 32 wound around adjacent tooth parts 312 in the circumferential direction are wound in opposite directions. In addition, the windings 32 wound around two tooth parts 312 each other are also wound in opposite directions.

Figure 4:
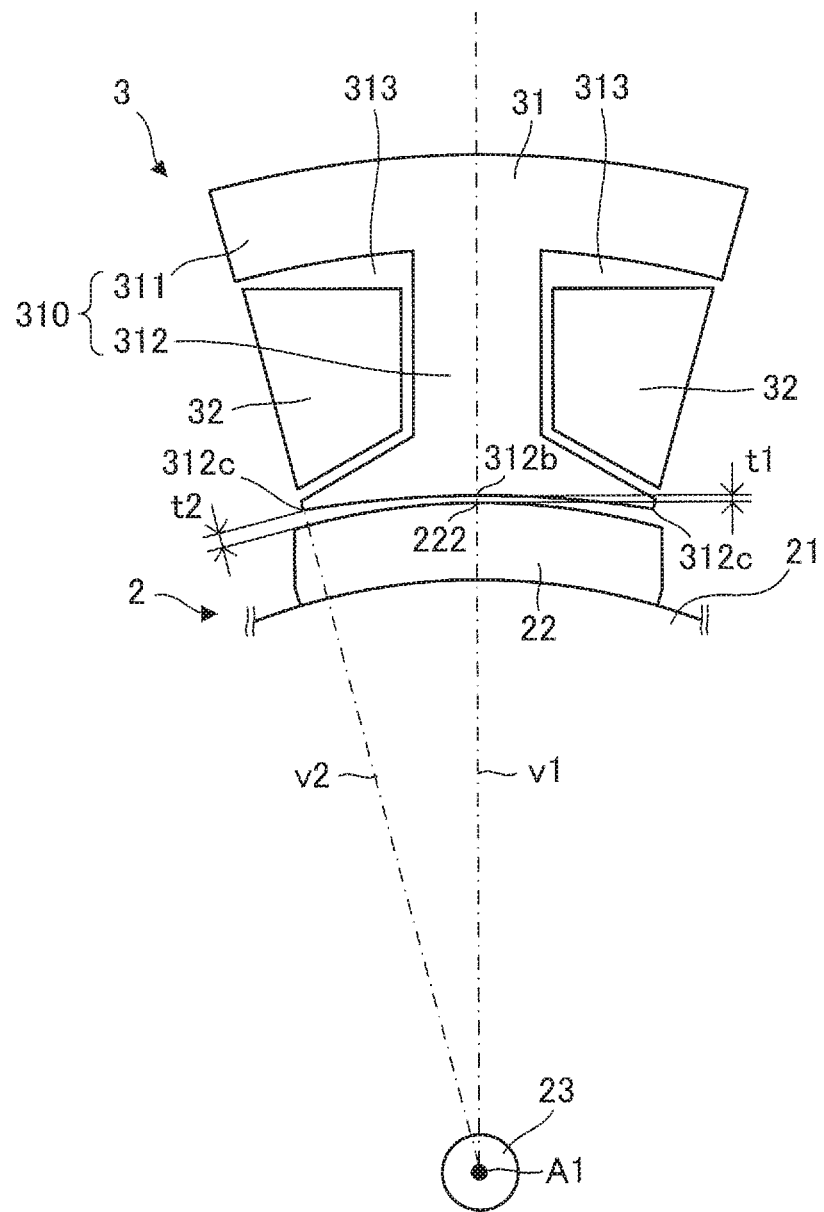
FIG. 4 is a partial cross-sectional view illustrating a positional relationship between the rotor and the stator.

FIG. 4 is a partial cross-sectional view illustrating a positional relationship between the rotor 2 and the stator 3. Specifically, FIG. 4 is a partial cross-sectional view illustrating a positional relationship between the tooth part 312 and the permanent magnet 22. An imaginary line v1 (first imaginary line) illustrated in FIG. 4 is a line passing through the rotation axis A1 and the center of the front end surface 312*a* (i.e., the tooth center 312*b*) in the circumferential direction. An imaginary line v2 (second imaginary line) illustrated in FIG. 4 is a line passing through the rotation axis A1 and the tooth end 312*c*.

The electric motor 1 (specifically, the rotor 2 and the stator 3) are assembled to satisfy an expression of $1 < t2/t1 \leq 8$, where t1 [mm] is a minimum distance from the tooth center 312*b* to the permanent magnet 22 (hereinafter simply referred to as a "distance t1") and t2 [mm] is a distance from the tooth end 312*c* to the permanent magnet 22. Accordingly, magnetic attraction force occurring in the tooth end 312*c* can be reduced, and thus torque ripples can be reduced.

In the example illustrated in FIG. 4, the distance t1 is a minimum distance from the tooth center 312*b* to the permanent magnet 22 (specifically, the permanent magnet center 222) in a state where the center of the permanent magnet 22 (e.g., the permanent magnet center 222) in the circumferential direction is located on the imaginary line v1. In the example illustrated in FIG. 4, the distance t2 is a distance from the tooth end 312*c* to the permanent magnet 22 on the imaginary line v2 in a state where the permanent magnet center 222 is located on the imaginary line v1.

The electric motor 1 (specifically, the rotor 2 and the stator 3) is more preferably assembled to satisfy an expression of $1 < t2/t1 \leq 2$. Accordingly, a decrease in motor efficiency due to an increase in a current can be suppressed, and thus torque ripples can be further reduced.

Variations

Figure 5:
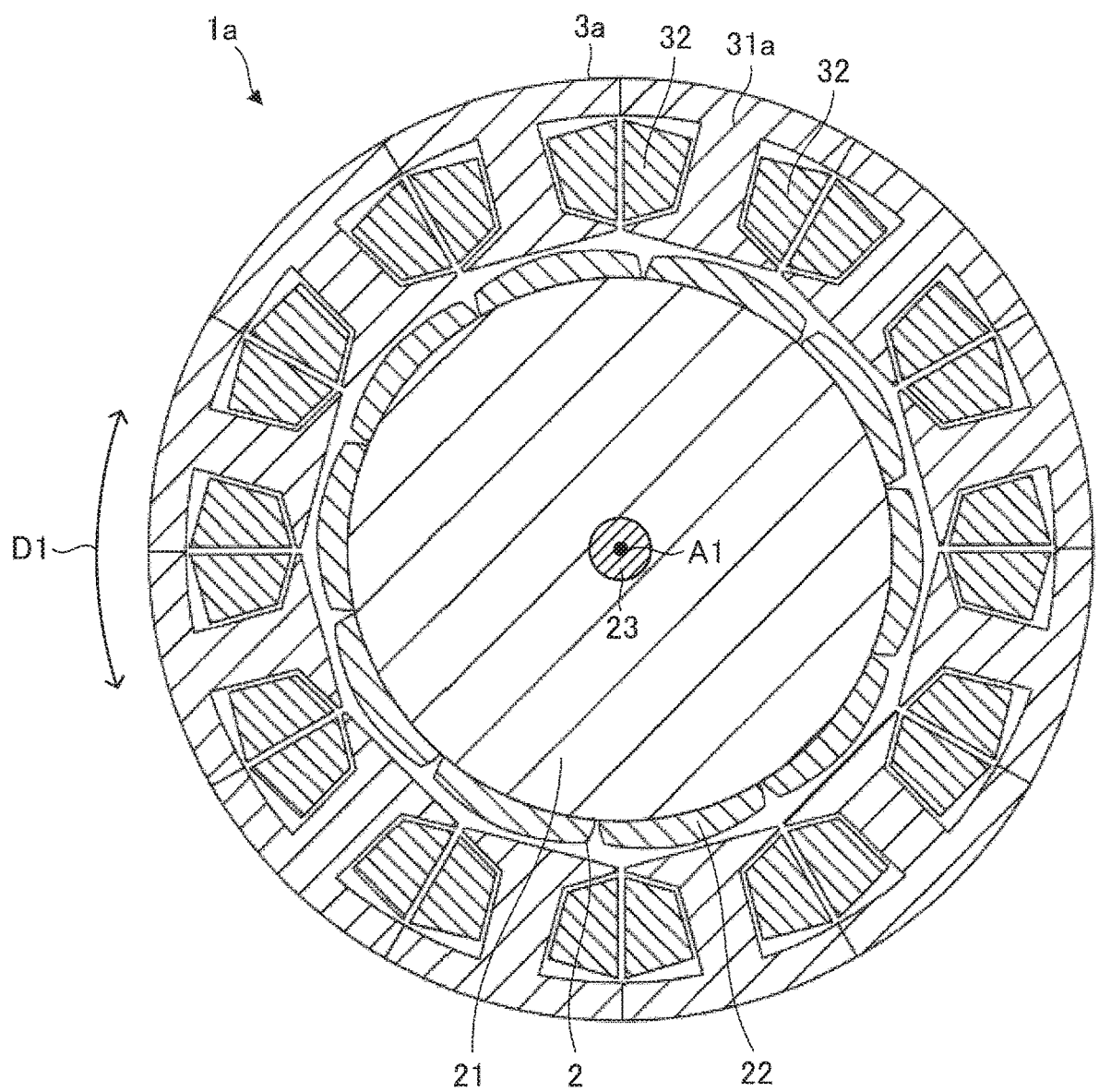
FIG. 5 is a cross-sectional view schematically illustrating an internal structure of an electric motor according to a first variation.

FIG. 5 is a cross-sectional view schematically illustrating an internal structure of an electric motor 1*a* according to a variation.

Figure 6:
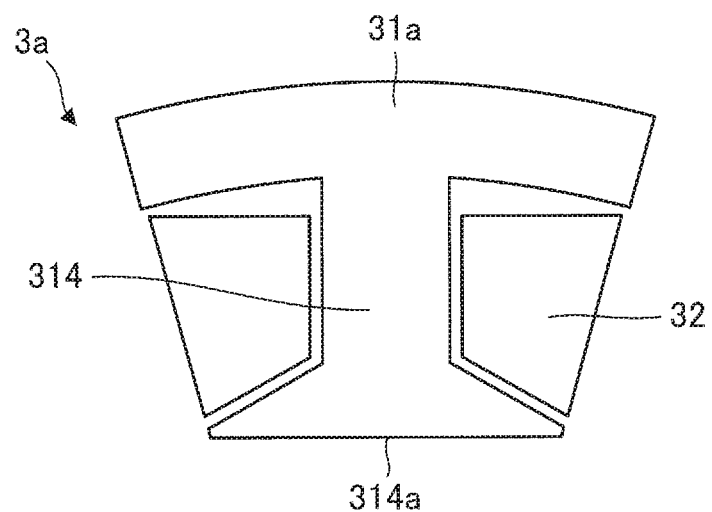
FIG. 6 is a partial cross-sectional view schematically illustrating a structure of a part of a stator core of a stator illustrated in FIG. 5.

FIG. 6 is a partial cross-sectional view schematically illustrating a structure of a part of a stator core 31*a* of a stator 3*a* illustrated in FIG. 5.

The electric motor 1*a* is different from the electric motor 1 according to the first embodiment in a structure of the stator 3*a* (specifically, tooth parts 314 of the stator core 31*a*), and is the same as the electric motor 1 in the other respects.

Specifically, a front end surface 314*a* of each of the tooth parts 314 is a flat surface. That is, in each of the cross sections illustrated in FIGS. 5 and 6, a front end of each of the tooth parts 314 is formed straight.

Advantages of the electric motor 1 according to the first embodiment (including advantages of the electric motor 1*a* according to the variation) will be described below.

Figure 7:
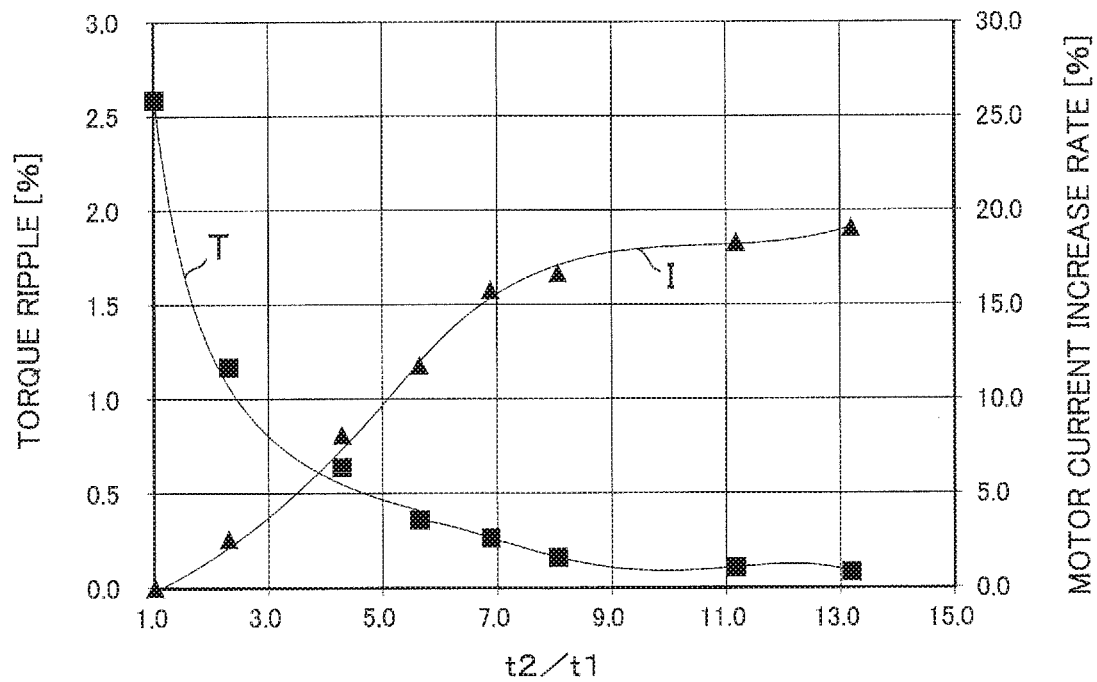
FIG. 7 is a diagram showing a relationship between torque ripples and a motor current increase rate in a case where a distance t2 from a tooth end to a permanent magnet is changed with respect to a distance t1 from a tooth center to the permanent magnet.

FIG. 7 is a diagram showing a relationship between torque ripples T [%] and a motor current increase rate I [%] in a case where the distance t2 from the tooth end 312*c* to the permanent magnet 22 is changed with respect to the distance t1 from the tooth center 312*b* to the permanent magnet 22. The motor current increase rate I is a current increase rate necessary for controlling torque to be constant. In FIG. 7, a result of measuring torque ripples is represented as T (an approximate curve based on measurement data), and the motor current increase rate is represented as I (an approximate curve based on measurement data).

As shown in FIG. 7, as t2/t1 increases, torque ripples decrease. In other words, by increasing the distance t2 with respect to the distance t1, a change in the number of magnetic flux linkages in the slot 313 is reduced, and thus torque ripples can be reduced. In the range of t2/t1>8.0, as the distance t2 increases, a current (motor current) necessary for keeping torque constant increases. Accordingly, copper loss increases, and thus motor efficiency decreases. In addition, in the range of t2/t1>8.0, the amount of change in the number of magnetic flux linkages is saturated, and thus, an effect of reducing torque ripples is small. Thus, since the electric motor 1 satisfies an expression of $1 < t2/t1 \leq 8$, a decrease in motor efficiency can be reduced, and torque ripples can be reduced. Accordingly, increases in vibrations and noise of the electric motor 1 can be suppressed.

In the range of $2.0 < t2/t1 \leq 8.0$, the torque ripples T [%] decreases to 0.2 at t2/t1=8.0, but the motor current increase rate I [%] increases to 16.6 at t2/t1=8.0. That is, when t2/t1 is changed from 2.0 to 8.0, the torque ripples T [%] decrease by approximately 1.1, and the motor current increase rate I [%] increases by approximately 14.6. In the range of $1 < t2/t1 \leq 2.0$, the torque ripples T [%] decrease to 1.3 at t2/t1=2.0, the motor current increase rate I [%] is reduced to 2.0 at t2/t1=2.0. Thus, since the electric motor 1 satisfies the expression of $1 < t2/t1 \leq 2$, torque ripples can be efficiently reduced, and high motor efficiency can be obtained.

Figure 8:
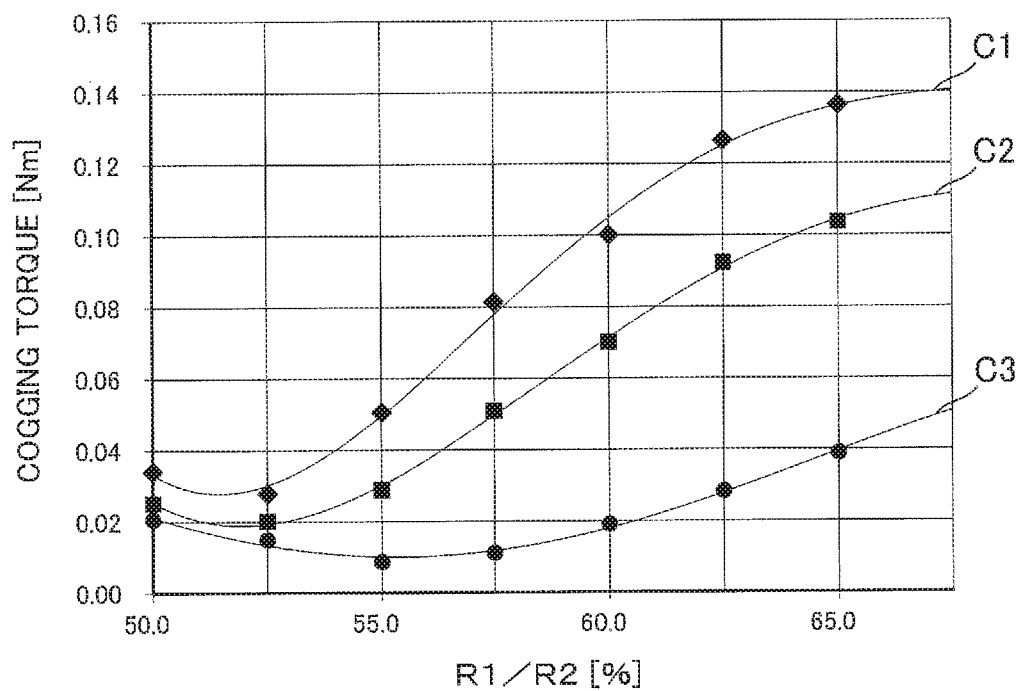
FIG. 8 is a diagram showing a relationship between a ratio R1/R2 and cogging torque.

FIG. 8 is a diagram showing a relationship between the ratio R1/R2 [%] (outer diameter ratio) and cogging torque [Nm]. Specifically, the diagram shows change of cogging torque when the radius R1 of the rotor 2 is changed with respect to the radius R2 of the stator 3. Curve C1 illustrated in FIG. 7 represents a measurement result in an electric motor satisfying t2/t1=1.0 (an approximate curve based on measurement data), curve C2 represents a measurement result in an electric motor satisfying t2/t1=2.0 (an approximate curve based on measurement data), and curve C3 represents a measurement result in an electric motor satisfying t2/t1=8.0 (an approximate curve based on measurement data).

As shown in FIG. 8, by increasing the ratio t2/t1 (specifically, the distance t2 with respect to the distance t1), the cogging torque can be reduced. By further increasing the ratio t2/t1, a ratio of the change in the cogging torque to the change in the ratio R1/R2 can be reduced. Specifically, in the range of $1 < t2/t1 \leq 8$, the cogging torque can be reduced under a condition that the outer diameter ratio is the same, as compared to the electric motor (C1) satisfying t2/t1=1.0.

As illustrated in FIG. 8, in the case of t2/t1=1.0 (curve C1), the cogging torque is at minimum when the ratio R1/R2 is 52.5%. In the case of t2/t1=8.0 (curve C3), the cogging torque is at minimum when the ratio R1/R2 is 55%. In the case of t2/t1=8.0, the cogging torque can be made smaller than the electric motor (C1) satisfying t2/t1=1.0 in a range where the ratio R1/R2 is 55% or more and 62.5% or less ($0.55 < R1/R2 \leq 0.625$).

In the range of $1 < t2/t1 \leq 8$, when the ratio R1/R2 is 50% or more and 62.5% or less ($0.50 < R1/R2 \leq 0.625$), the cogging torque can be reduced to 0.13 Nm or less. In the range of $0.55 \leq R1/R2 \leq 0.625$, as the ratio R1/R2 increases, the surface area of the permanent magnets 22 increases. Accordingly, the cogging torque increases. In the case of maintaining torque of the electric motor 1, however, copper loss is reduced due to a decrease in motor current, and thus, motor efficiency can be enhanced. In the range of R1/R2 [%]>62.5%, an effect of suppressing the cogging torque is low.

In the range of 1<t2/t1≤8, when the ratio R1/R2 is 50% or more and 55% or less (0.50<R1/R2≤0.55), the cogging torque can be reduced to 0.05 Nm or less, and the effect of suppressing the cogging torque is very high. In addition, in the range of 2 t2/t1≤8, if the ratio R1/R2 is 50% or more and 55% or less (0.50≤R1/R2≤0.55), the cogging torque can be made smaller than the electric motor (C1) satisfying t2/t1=1.0.

In general, the cogging torque is strongly affected by a change of magnetic permeance in the slot. For example, the cogging torque increases when magnetic flux density in a gap between the stator and the rotor increases. Thus, when high energy product magnets containing neodymium, iron, and boron (Nd—Fe—B) as main components are used as permanent magnets of a rotor, the cogging torque increases. In this embodiment, even in the case of using high energy product magnets as the permanent magnets 22, the cogging torque can be reduced by adjusting the ratio t2/t1 and the ratio R1/R2 as described above.

Figure 9:
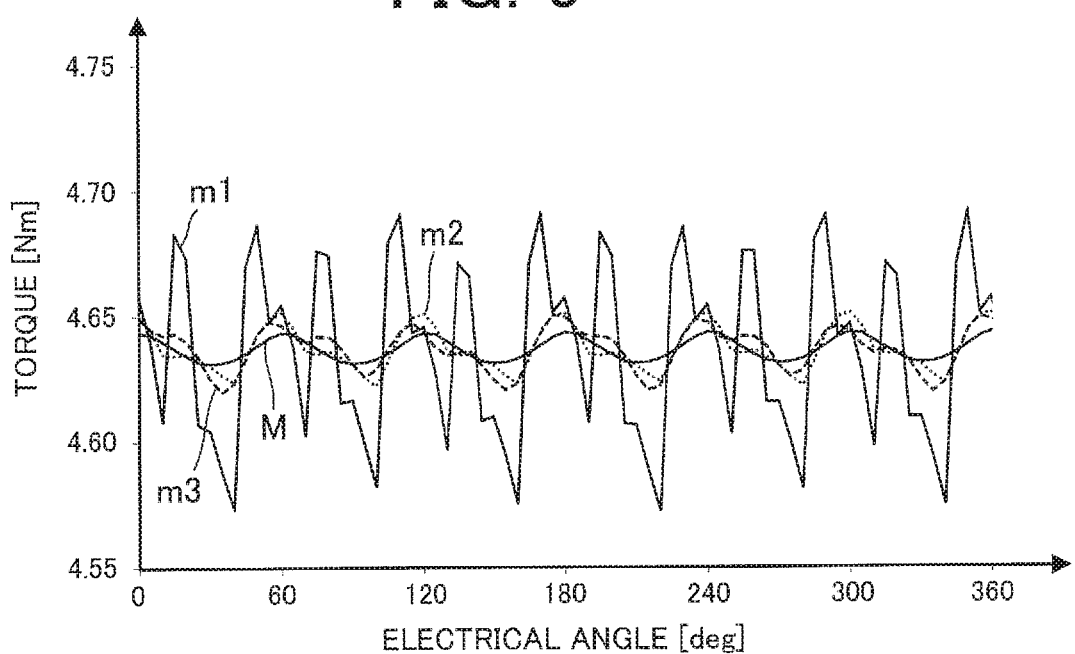
FIG. 9 is a diagram showing fluctuations in torque (torque ripples) during rotation of electric motors.

FIG. 9 is a diagram showing fluctuations in torque (torque ripples) during rotation of the electric motors. FIG. 9 shows results of measurements of torque ripples in the electric motor 1 according to the first embodiment and three types of electric motors m1, m2, and m3 as comparative examples. The result of measurement in the electric motor 1 according to the first embodiment is represented as M.

The electric motor 1 according to the first embodiment satisfies Rc>rc and Rm<rm. The electric motor m1 as a first comparative example satisfies Rc=rc and Rm=rm. The electric motor m2 as a second comparative example satisfies Rc>rc and Rm=rm. The electric motor m3 as a third comparative example satisfies Rc=rc and Rm<rm.

As shown in FIG. 9, by satisfying Rc>rc and Rm<rm, the distance t2 can be easily increased, and thus the electric motor 1 satisfying a relationship of t2>t1 can be easily obtained. Accordingly, as illustrated in FIG. 9, torque ripples can be reduced and stable motor characteristics can be obtained, as compared to the electric motors m1, m2, and m3 according to the first through third comparative examples.

In addition, by forming the shape of the tooth part 312 to satisfy Rc>rc, the amount of electromagnetic steel sheets necessary for punching can be reduced, and thus a yield can be enhanced.

In a case where an aluminum wire as the winding 32 is wound with small winding tension, the natural frequency of the stator 3 decreases, and is easily affected by electromagnetic excitation force. Even in this case, the electric motor 1 according to the embodiment described above can reduce vibrations and noise of the electric motor 1.

In general, in a case where the length of a stator in the rotation axis direction of an electric motor is larger than the diameter of the stator, it is necessary to increase the length of windings. Accordingly, an electric resistance value increases, and copper loss increases. In the electric motor 1 according to the first embodiment, the length of the stator core 31 in the rotation axis direction is equal to or less than half the diameter of the stator core 31. Thus, a winding possible region can be enlarged, and the total length of the winding 32 can be reduced, and thus an electric resistance value can be reduced. For example, a wide aluminum wire may be used as the winding 32. Thus, copper loss can be reduced, and motor efficiency can be improved.

In general, if the length of the stator in the rotation axis direction is small, the natural frequency of the stator decreases, and the motor is easily affected by the electromagnetic excitation force. Even in this case, the electric motor 1 according to this embodiment described above can reduce vibrations and noise of the electric motor 1.

In general, deformation of a shaft of the rotor and the stator causes vibrations and noise of the electric motor. Thus, to increase the strength of the shaft of the rotor, the width of the shaft is preferably increased. However, the wider the shaft is, the more energy loss is generated, and thus a motor efficiency decreases. The electric motor 1 according to this embodiment described above can suppress a decrease in motor efficiency even in the case of using a wide shaft as the shaft 23.

Second Embodiment

An air conditioner 10 according to a second embodiment of the present invention will be described.

Figure 10:
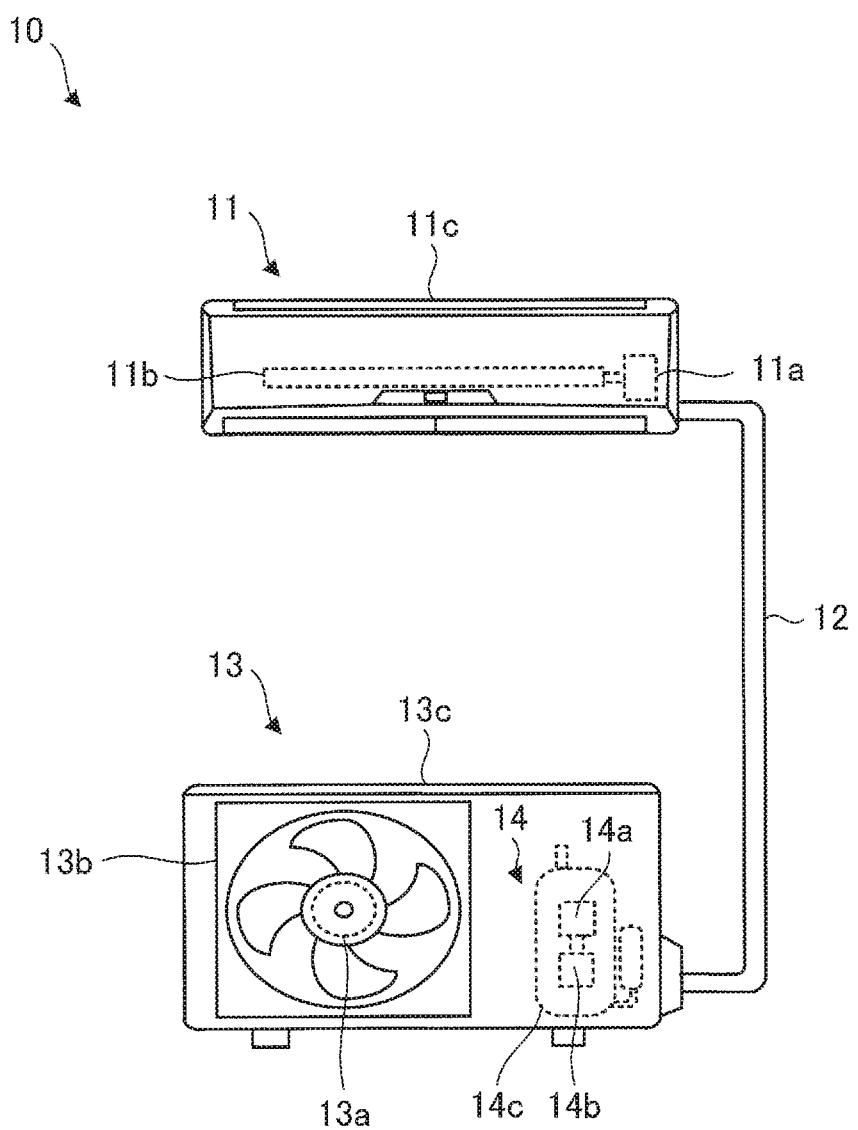
FIG. 10 is a diagram schematically illustrating a configuration of an air conditioner according to a second embodiment of the present invention.

FIG. 10 is a diagram schematically illustrating a configuration of the air conditioner 10 according to the second embodiment of the present invention.

The air conditioner 10 (e.g., a refrigerating and air-conditioning apparatus) according to the second embodiment includes an indoor unit 11 as an air blower (first air blower), a refrigerant pipe 12, an outdoor unit 13 as an air blower (second air blower) connected to the indoor unit 11 by the refrigerant pipe 12.

The indoor unit 11 includes an electric motor 11a (e.g., the electric motor 1 according to the first embodiment), an air blowing unit 11b that blows air when being driven by the electric motor 11a, and a housing 11c that covers the electric motor 11a and the air blowing unit 11b. The air blowing unit 11b includes, for example, blades that are driven by the electric motor 11a.

The outdoor unit 13 includes an electric motor 13a (e.g., the electric motor 1 according to the first embodiment), an air blowing unit 13b, a compressor 14, and a heat exchanger (not shown). The air blowing unit 13b blows air when being driven by the electric motor 13a. The air blowing unit 13b includes, for example, blades that are driven by the electric motor 13a. The compressor 14 includes an electric motor 14a (e.g., the electric motor 1 according to the first embodiment), a compression mechanism 14b (e.g., a refrigerant circuit) that is driven by the electric motor 14a, and a housing 14c that covers the electric motor 14a and the compression mechanism 14b.

In the air conditioner 10 according to the second embodiment, at least one of the indoor unit 11 and the outdoor unit 13 includes the electric motor 1 described in the first embodiment (including the variation thereof). Specifically, as a driving source of the air blowing unit, the electric motor 1 described in the first embodiment is applied to at least one of the electric motors 11a and 13a. In addition, as the electric motor 14a of the compressor 14, the electric motor 1 described in the first embodiment (including the variation thereof) may be used.

The air conditioner 10 can perform operations such as a cooling operation of sending cold air and a heating operation of sending warm air from the indoor unit 11. In the indoor unit 11, the electric motor 11a is a driving source for driving the air blowing unit 11b. The air blowing unit 11b can send conditioned air.

In the air conditioner 10 according to the second embodiment, the electric motor 1 described in the first embodiment (including the variation thereof) is applied to at least one of the electric motors 11a and 13a, and thus, advantages similar to those described in the first embodiment can be obtained.

In general, air blowers mounted on air conditioners demand low vibrations and low noise strictly. The use of the electric motor 1 according to the first embodiment (including the variation thereof) as a driving source for the air blower (e.g., the indoor unit 11) mounted on the air conditioner 10 according to the second embodiment can reduce torque ripples, and thus, can reduce vibrations and noise of the air blower.

In addition, the use of the electric motor 1 according to the first embodiment (including the variation thereof) as a driving source for the compressor 14 can reduce torque ripples, and thus, can reduce vibrations and noise of the compressor 14.

The electric motor 1 described in the first embodiment can be mounted on equipment including a driving source, such as a ventilator, a home appliance, or a machine tool, as well as the air conditioner 10.

Features of the embodiments and features of the variation described above can be combined as appropriate.

What is claimed is:

1. An electric motor comprising:
   a rotor including a rotor core and a plurality of permanent magnets fixed to an outer surface of the rotor core, the rotor having ten magnetic poles and being rotatable on a rotation axis; and
   a stator including a stator core having a plurality of electromagnetic steel sheets stacked in a rotation axis direction, and including a winding wound around the stator core by concentrated winding, wherein
   the stator core includes
   twelve slots, and
   a tooth part having a front end surface facing one permanent magnet of the plurality of permanent magnets, the tooth part being adjacent to at least one of the slots,
   the electric motor satisfies an expression of $$2 \leq t2/t1 \leq 8$$

where t1 is a minimum distance from a center of the front end surface in a circumferential direction to the one permanent magnet, and t2 is a distance from an end of the front end surface in the circumferential direction to the one permanent magnet,
   a ratio R1/R2 of a distance R1 to a radius R2 of the stator is 0.50 or more and 0.55 or less, the distance R1 being a distance from the rotation axis to a permanent magnet center part that is a center of the one permanent magnet in the circumferential direction, and
   a shape of each of the permanent magnets is an arc shape in cross section perpendicular to the rotation axis.

2. The electric motor according to claim 1, wherein a distance from the end of the front end surface in the circumferential direction to the rotation axis is larger than a distance from the center of the front end surface in the circumferential direction to the rotation axis.

3. The electric motor according to claim 1, wherein a distance from a permanent magnet end to the rotation axis is smaller than a distance from a permanent magnet center to the rotation axis, the permanent magnet end being an end in the circumferential direction of a surface of the one permanent magnet facing the tooth part, the permanent magnet center being a center of the surface of the one permanent magnet in the circumferential direction.

4. The electric motor according to claim 3, wherein the surface of the one permanent magnet is formed in a shape of an arc in the circumferential direction.

5. The electric motor according to claim 1, wherein the stator core is formed of a plurality of split cores arranged annularly in the circumferential direction.

6. The electric motor according to claim 1, wherein
   a material for the winding is an aluminum wire, and
   a length of the stator core in the rotation axis direction is equal to or less than half a diameter of the stator core.

7. The electric motor according to claim 1, wherein the minimum distance t1 is a minimum distance from the center of the front end surface to the one permanent magnet in a state where a center of the one permanent magnet in the circumferential direction is located on a first imaginary line passing through the rotation axis and the center of the front end surface in the circumferential direction.

8. The electric motor according to claim 7, wherein the distance t2 is a distance from the end of the front end surface to the one permanent magnet on a second imaginary line passing through the rotation axis and the end of the front end surface in the state where the center of the one permanent magnet is located on the first imaginary line.

9. An air blower comprising:
   an electric motor; and
   an air blowing unit that is driven by the electric motor, wherein
   the electric motor includes
   a rotor including a rotor core and a plurality of permanent magnets fixed to an outer surface of the rotor core, the rotor having ten magnetic poles and being rotatable on a rotation axis, and
   a stator including a stator core having a plurality of electromagnetic steel sheets stacked in a rotation axis direction, and including a winding wound around the stator core by concentrated winding,
   the stator core includes
   twelve slots, and
   a tooth part having a front end surface facing the one permanent magnet of the plurality of permanent magnets, the tooth part being adjacent to at least one of the slots,
   the electric motor satisfies an expression of $$2 \leq t2/t1 \leq 8$$

where t1 is a minimum distance from a center of the front end surface in a circumferential direction to the one permanent magnet, and t2 is a distance from an end of the front end surface in the circumferential direction to the one permanent magnet,
   a ratio R1/R2 of a distance R1 to a radius R2 of the stator is 0.50 or more and 0.55 or less, the distance R1 being a distance from the rotation axis to a permanent magnet center part that is a center of the one permanent magnet in the circumferential direction, and
   a shape of each of the permanent magnets is an arc shape in cross section perpendicular to the rotation axis.

10. An air conditioner comprising:
    an indoor unit: and
    an outdoor unit connected to the indoor unit, wherein
    at least one of the indoor unit and the outdoor unit includes an electric motor,
    the electric motor includes
    a rotor including a rotor core and a plurality of permanent magnets fixed to an outer surface of the rotor core, the rotor having ten magnetic poles and being rotatable on a rotation axis, and
    a stator including a stator core having a plurality of electromagnetic steel sheets stacked in a rotation axis direction, and including a winding wound around the stator core by concentrated winding, the stator core includes twelve slots, and a tooth part having a front end surface facing one permanent magnet of the plurality of permanent magnets, the tooth part being adjacent to at least one of the slots, the electric motor satisfies an expression of $$2 \le t2/t1 \le 8$$

where t1 is a minimum distance from a center of the front end surface in a circumferential direction to the one permanent magnet, and t2 is a distance from an end of the front end surface in the circumferential direction to the one permanent magnet, a ratio R1/R2 of a distance R1 to a radius R2 of the stator is 0.50 or more and 0.55 or less, the distance R1 being a distance from the rotation axis to a permanent magnet center part that is a center of the one permanent magnet in the circumferential direction, and a shape of each of the permanent magnets is an arc shape in cross section perpendicular to the rotation axis.

11. The air blower according to claim 9, wherein a distance from the end of the front end surface in the circumferential direction to the rotation axis is larger than a distance from the center of the front end surface in the circumferential direction to the rotation axis.

12. The air blower according to claim 9, wherein a distance from a permanent magnet end to the rotation axis is smaller than a distance from a permanent magnet center to the rotation axis, the permanent magnet end being an end in the circumferential direction of a surface of the one permanent magnet facing the tooth part, the permanent magnet center being a center of the surface of the one permanent magnet in the circumferential direction.

13. The air blower according to claim 12, wherein the surface of the one permanent magnet is formed in a shape of an arc in the circumferential direction.

14. The air conditioner according to claim 10, wherein a distance from the end of the front end surface in the circumferential direction to the rotation axis is larger than a distance from the center of the front end surface in the circumferential direction to the rotation axis.

15. The air conditioner according to claim 10, wherein a distance from a permanent magnet end to the rotation axis is smaller than a distance from a permanent magnet center to the rotation axis, the permanent magnet end being an end in the circumferential direction of a surface of the one permanent magnet facing the tooth part, the permanent magnet center being a center of the surface of the one permanent magnet in the circumferential direction.

16. The air conditioner according to claim 15, wherein the surface of the one permanent magnet is formed in a shape of an arc in the circumferential direction.

* * * * *